United States Patent
Fanton et al.

(10) Patent No.: US 8,035,882 B2
(45) Date of Patent: Oct. 11, 2011

(54) ACTIVE DEVICE HAVING VARIABLE ENERGY/OPTICAL PROPERTIES

(75) Inventors: Xavier Fanton, Aulnay sous Bois (FR); Jean-Christophe Giron, Eusen (BE); Philippe Letocart, Raeren (BE); Rino Messere, Modave (BE); Annabelle Andreau-Wiedenmaier, Aachen (DE); Manfred Gillissen, Herzogenrath (DE); Karl-Heinz Paffen, Herzogenrath (DE); Hermann Joeris, Uebach-Palenberg (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/375,312

(22) PCT Filed: Jul. 20, 2007

(86) PCT No.: PCT/FR2007/051698
§ 371 (c)(1),
(2), (4) Date: May 1, 2009

(87) PCT Pub. No.: WO2008/012461
PCT Pub. Date: Jan. 31, 2008

(65) Prior Publication Data
US 2009/0323162 A1 Dec. 31, 2009

(30) Foreign Application Priority Data
Jul. 28, 2006 (FR) ...................................... 06 53173

(51) Int. Cl.
*G02F 1/15* (2006.01)

(52) U.S. Cl. ...................................................... 359/265
(58) Field of Classification Search .................... 359/265
See application file for complete search history.

(56) References Cited

U.S. PATENT DOCUMENTS

| 4,465,339 A * | 8/1984 | Baucke et al. ................. 359/274 |
| 4,852,979 A | 8/1989 | Agrawal |
| 4,909,610 A * | 3/1990 | Baucke et al. ................. 359/265 |
| 5,069,535 A * | 12/1991 | Baucke et al. ................. 359/273 |
| 6,265,986 B1 | 7/2001 | Oka et al. |
| 2003/0227663 A1 | 12/2003 | Agrawal et al. |
| 2007/0201122 A1* | 8/2007 | Dozeman et al. .............. 359/265 |

FOREIGN PATENT DOCUMENTS

| FR | 2 191 136 A1 | 2/1974 |
| JP | 11-326904 | 11/1999 |

* cited by examiner

Primary Examiner — Joseph P Martinez
(74) *Attorney, Agent, or Firm* — Oblon, Spivak, McClelland, Maier & Neustadt, L.L.P.

(57) ABSTRACT

The invention relates to an active device having variable energy/light transmission properties (100) comprising an active system (1, 12) between a protective substrate (2) and a protective cover (3), selected from an essentially inorganic electrochromic system, a light valve system, a liquid crystal system, a gasochromic system, a thermochromic system, means leakproof to liquid water and/or water vapor, a surround (50) made from at least one metal based part (5a, 5b) on the periphery of the device, the surround being assembled with the cover and with the substrate by assembling means (61' to 64') forming at least part of the means leakproof to water vapor.

24 Claims, 5 Drawing Sheets

ACTIVE DEVICE HAVING VARIABLE ENERGY/OPTICAL PROPERTIES

BACKGROUND

1. Field

The invention relates to an active device having variable energy/light transmission properties comprising an active system between a protective substrate and a protective cover.

2. Description of the Related Art

The first types of active system related to the invention are essentially inorganic electrochemical systems, in particular essentially inorganic (mineral) electrochromic glazings, which are used to adjust the light and heat transmission, described for example, in particular, in patents EP-867 752, EP-831 360, PCT/FR00/00675, PCT/FR99/01653, the electrolyte being in the form of an essentially mineral layer, all the layers of the system then being essentially mineral. This type of electrochromic system is commonly designated by the term "all-solid" electrochrome. In general, these essentially inorganic electrochromic systems comprise two layers of electrochromic material separated by an electrolyte layer and framed by two electroconductive layers forming electrodes.

Systems called "light valves" also exist: these are polymer based films in which microdroplets are placed containing particles capable of moving into a preferential direction under the action of an electrical field. An example thereof is described in patent WO93/09460.

Liquid crystal systems also exist, having an operating mode similar to the preceding ones: they use a polymer film placed between two conductive layers and in which liquid crystal droplets are dispersed, in particular nematic having a positive dielectric anisotropy. When the film is energized, the liquid crystals are oriented in a preferential axis, thereby allowing viewing. When deenergized, the film becomes hazy. Examples thereof are described in patents EP-238 164, U.S. Pat. Nos. 4,435,047, 4,806,922, 4,732,456. Mention can also be made of cholesteric liquid crystal polymers, like those described in patent WO92/19695.

A second type of active system to which the invention is related concerns the layers or stacks of layers of which the properties are changed without electric power supply, under the effect of heat or light: mention can be made of thermochromic layers, in particular based on vanadium oxide, thermotropic layers or mineral or organic photochromic layers, in particular polymers, which may be in the form of polymer films or even gel films. This is in particular the case of thermotropic gels, for example those described in patents EP 639 450, U.S. Pat. No. 5,615,040, WO 94/20294 and EP 878 296.

A fourth type of active system concerns a gasochromic system of which the properties are modified by the passage of a gas in particular comprising hydrogen, and made from a thin layer of $WO_3$ often surmounted by a layer of platinum deposited on the surface of a glass element.

All these abovementioned systems have in common the fact that they may, to a more or less broad extent, be sensitive to mechanical, chemical aggression, or to contact with water, or to exchanges with the exterior.

These are the reasons why, to preserve their satisfactory operation, these active systems are commonly placed against at least one protective supporting substrate. They are usually placed between a protective substrate and a protective cover, for example made from glass, joined together by means of assembly polymer sheet(s) of the thermoplastic type.

Plastic leakproofing means are often provided, for the purpose of isolating the active system from the exterior to the maximum.

Leakproofing means are thus described in French patent 2 815 374, which relates to a laminated glazing with a system of plastic seals composed of a plurality of elements in order to simultaneously perform all the functions of isolation from gases, liquids, dust. Thus, a polyisobutylene based seal (barrier to gases) called butyl seal, is placed between the substrate and the cover, and a polysulfide or polyurethane seal (barrier to liquids), joined to the butyl seal.

However, these seals have several drawbacks. In fact, these seals must at best meet at least three requirements which are not necessarily compatible:
- as we have seen, they must isolate the active system from the exterior. They must therefore play a barrier role as effectively as possible, even in the long term, in particular against water or any other solvent, and in its vapor form and/or in its liquid form, they must be capable of withstanding extreme climatic conditions, in particular a high moisture content and/or high temperature,
- their utilization, the way in which they are installed, is not necessarily the simplest from the industrial standpoint,
- and finally, their mechanical properties may be far inferior to those that may be required.

It is the object of the invention to remedy these drawbacks, in particular by finding means for controlling the durability of such abovementioned devices with active systems, in order to improve and/or better control their reproducibility, particularly by means not putting into question the present manufacturing methods of these glazing type devices, and preferably which may tend to simplify them.

BRIEF SUMMARY

For this purpose, the invention proposes an active device having variable energy/light transmission properties comprising:
- an active system between a protective substrate and a protective cover, selected from an essentially inorganic electrochromic system, a light valve system, a liquid crystal system, a gasochromic system, a thermochromic system,
- leakproof means to liquid water and/or water vapor,
- a surround, made from at least one metal based part on the periphery of the device, the surround being assembled at least partly by the edge of said substrate and/or by the edge of said cover by assembling means forming at least part of the water vapor leakproof means.

The metal based surround is designed and assembled for the purpose of isolation from miscellaneous aggression from gas, liquids or dust. It may also provide a mechanical reinforcement, by forming for example a frame for mounting glazing (the vehicle body in the case of automobile glazing) or for mounting as double glazing for a building.

The surround extends (at least mainly) along the periphery of the substrate and of the cover. The surround is neither arranged between the substrate and the cover, nor maintained by the internal face of the substrate. Its mounting is thereby simplified and can take place even after a possible assembly of the cover and the substrate. The surround may also be used to protect and/or facilitate electrical connections.

The surround is suitable for any type of assembly of the substrate with the cover, in particular for lamination, by covering cast resin, or any other peripheral means. The surround is also suitable when the substrate and cover are simply kept at a distance, for example by spacers or a glass or metal frame. The surround itself may serve alone to maintain a distance between the substrate and the cover.

The active device according to the invention is protected by the surround and its assembling means is durable, compact, reliable, easy to handle without any risk of breakage of the substrate or of the cover.

Advantageously, the surround and the assembling means may form at least in a majority, preferably essentially, the leakproof means to liquid water and vapor.

In particular, if the complete device (fabrication of the active system, spacing or assembly of cover and substrate, assembly of the surround) is produced on the same site continuously or at close intervals, it is thereby unnecessary to provide other leakproof means, particularly to water vapor, because once assembled, the surround procures a sufficient threshold of protection.

In particular, in the case of a laminated glazing, it is unnecessary either to provide a peripheral groove (for example by shrinkage of the spacer) or to place a vapor barrier in this groove, such as a butyl seal and/or a barrier to liquid water such a polyurethane seal.

If the surround is not assembled on the place of production of the system or if this assembly is delayed (storage of the system for example), it is nevertheless possible to provide additional temporary or permanent leakproof means between the substrate and the cover. This serves to store and/or transport the active device.

Furthermore, the surround and the assembling means may form a second level of protection if the leakproof means to water vapor and/or liquid water between the substrate and the cover are not sufficiently effective or robust.

The surround according to the invention is suitable for any type, any geometry of device. The substrate and/or the cover may have any shape (rectangular, round, etc.). The device may have any size in particular with an area exceeding 1 m$^2$.

The surround is incapable of disturbing the energy/light transmission properties of the active system.

The surround may be monolithic or may be in a plurality of parts, particularly with corner parts, which are joined together by joining means preferably along the thickness of the device rather than surrounding the device.

The surround may be completely metallic, typically a self-supported element to which the assembling means are added.

Alternatively, the surround and the associated assembling means form a single element comprising a membrane composed in bulk of a material based on polyisobutylene, or even ethylene vinylacetate or polyamide, membrane covered on the outer surface with a film composed of metal and synthetic material(s).

The surround may be hollow or solid, curved, flat, may or may not match the contours of the device, in particular the edge of the substrate. The surround may preferably have a part, called a side part, surrounding the perimeter and being pressed by its internal face against the edge of the substrate and kept fastened by the assembling means.

In order to surround the entire periphery, the free ends of the surround may overlap in pairs, or have matching shapes adapted to cooperate mutually to carry out their assembly by abutment. The ends may also be separated by glass spacers.

The surround may be thin. The surround may be made from at least one metal foil of aluminum preferably having a minimum thickness of about 200 μm or from stainless steel preferably having a minimum thickness of about 500 μm.

The surround may be thicker, in particular for its fastening, for example on rails, in particular wall mounted.

The surround may be in the form of a substantially flat profiled section about 1 mm thick with a substantially parallelepipedic cross section. This profile advantageously has low mechanical inertia, that is, it can be easily wound by having a low winding radius of 10 cm for example.

The surround may be preformed (cast, molded, extruded, etc.), folded back on the cover and the substrate by a bending system. Thus, during the method, the corner edging can be carried out for example by bending using machines well known to a person skilled in the art specialized in material processing.

The surround may be sufficiently stiff to perform the function mechanically holding the substrate and the cover. In this configuration, its stiffness is defined by the very nature of its constituent material, of which the linear buckling strength must be at least 400N/m.

The metal surround may be placed as a ribbon on the edges and guarantee the mechanical assembly of the device thanks to the assembling means which ensure its complete adhesion to the cover and to the substrate.

The metal surround may itself be covered by corrosion protection means, preferably by a polysulfide or a polyimide, in particular for outdoor uses.

In the case of a gasochromic system, the surround forms a closed system with the gas flow lines (surround perforated for the lines).

The surround may be assembled at least partly by the edge of the substrate and/or of the cover and/or by the borders of the main outer faces of the cover and/or of the substrate.

In an advantageous embodiment, the surround is assembled at least partly by the edge of the substrate and/or by the edge of the cover selected planar.

Naturally, in this embodiment, the substrate and/or the cover is sufficiently thick to maintain the surround. For example, the substrate and/or the cover may have a thickness of between 3 mm and 10 mm, preferably at least 4 mm, even more preferably between 4 and 6 mm.

In simple shapes to be produced, the surround may have a rectangular cross section (maintenance of the surround by the edge of the substrate and the borders of the cover) or an L section (maintenance of the surround by the edge of the substrate and the borders of the cover).

The surround may thus be assembled at least partly by the borders of the main outer faces of the cover and/or of the substrate.

This assembly is particularly advantageous in the case of a thin cover and/or substrate, for example having a thickness substantially close to 3 mm, or much lower, for example between 0.4 and 1.8 mm.

For example, in a simple form to be produced, the surround may have a U cross section.

The assembling means may be selected at least partly from one or the following means:
- a material based on leakproof to water vapor thermofusible polymer(s) selected from at least one of the following polymer families: ethylene vinylacetate, polyisobutylene, polyamide, optionally covered with a material that is leakproof to liquid water such as polysulfide, polyurethane or silicone,
- at least one metal weld, if necessary with ultrasonic welding, or a solder,
- an adhesive leakproof to water vapor and liquid water of the cement type like a thermofusible polyurethane.

The abovementioned thermofusible polymers may also be in the form of copolymers, branched polymers. These three thermofusible polymer families offer high intrinsic leaktightness, and they are in particular highly impermeable to water in vapor form. Being thermofusible, they are also particularly easy to process, at minimum cost: they can easily be injected in liquid or semi liquid form at the desired locations, by known industrial means. These polymers preferably constitute between 40 and 98% by weight of the material constituting the joining seal. Additives may be added thereto, having three different functions in particular.

On the one hand, at least one cross linking agent can be added, for example of the isocyanate and/or epoxy type. On the other hand, a number of mineral fillers can be added, preferably in powder form, and for example aluminum or magnesium oxide, silica sand, quartz, diatomaceous earth, thermal silica also called pyrogenation silica, or non-pyrogenated silica. They may also consist of silicates such as talc, mica, kaolinite, glass microspheres, or other mineral powders such as calcium carbonate, or mineral fibers.

Finally, one or more resins called "tacky" or "sticky" resins can be added, having the function of improving the adhesion of the seal to the material with which it is in contact. This may in particular consist of compounds having a very low molecular weight, not exceeding 10,000, in particular lower than 5,000 or between 500 and 2,000, and a softening point preferably of between 50 and 130° C., in particular between 90 and 100° C. One example is a saturated aliphatic hydrocarbon resin.

It is in fact not only important to select an intrinsically leakproof polymer, but one which also adheres very well to the materials with which it is in contact, in order to avoid creating diffusion pathways at the seal/material to be leakproofed interface, in order to avoid any delamination of the seal.

Instead of or in addition to the use of such a bonding agent, the distribution of the molecular weights present in the thermal feasible polymer can also be adjusted, especially in the case of polyisobutylenes: mixing a plurality of molecular weights serves to obtain good high temperature creep resistance (for high molecular weights), and also to have good adhesion to the materials to be leakproofed, and a good tack (for the low molecular weights).

On the whole, these thermofusible polymer assembling means advantageously have:
- a permeability to water vapor that is lower than or equal to 5 g/m²/24 h, in particular lower than or equal to 1 g/m²/24 h according to standard ASTM E 9663 T: this means that they are particularly impermeable to water,
- a softening point between 70 and 180° C., in particular between 90 and 100° C. or between 145 and 170° C.: hence they can be liquefied to install them/shape them at industrially acceptable temperatures,
- a viscosity between 0.8 and 8 Pa·s, measured at 190° C.

Advantageously, if this proves necessary, the seal previously described can be associated with another "complementary" seal in the sense that it supplements its leakproofing function, in particular to liquid water. This may also concern a second polysulfide, polyurethane or silicone seal, which can be placed against the first seal by coating the latter, in a manner known per se, or by co-extrusion and/or simultaneous extrusion of the two seals.

To obtain a leakproof condition in particular to liquid water, more precisely, a seal can be formed covering the assembling means leakproof to water vapor:
- by extrusion of polyurethane (PU) or of any thermoplastic elastomer TPE,
- by reactive injection of PU (technique often referred as RIM for Reactive Injection Molding),
- by thermoplastic injection of a PVC(polyvinyl chloride)/TPE mixture,
- by injection and vulcanization of terpolymer of ethylene, propylene and a diene EPDM.

Particularly preferred are adhesives of the thermofusible cement type based on polyurethane, in particular cross linkable with the moisture in the air, and ensuring both good impermeability to water vapor and to liquid water. Their permeability to water in vapor form is typically lower than or equal to 3 g/m²/24 h, or even close to 2.

The adhesive must preferably also resist detachment by liquid water, by ultraviolet and by tensile loads that may be applied perpendicular to the faces of the glazing and commonly called shear stresses, or by tensile loads applied parallel to the force of the weight of the glazing. A satisfactory cement must preferably withstand pulloff stresses of at least 0.45 MPa.

Preferably, the adhesive may have rapid bonding properties, on the order of a few seconds. The setting of a cement may also be slow in order to check the electrical connections or even to make them again.

Welds are preferred for their properties of leaktightness to water vapor and gas, to the epoxy type conductive cement loaded for example with silver.

The assembling means, or a portion thereof, may be electrically insulating, in particular having an electrical conductivity lower than $10^{-4}$ ohm$^{-1}$·cm$^{-1}$.

However, in order to facilitate one or more electrical connections by a metal surround in particular, this metal surround may be assembled—on the major portion or on the whole periphery or on the main outer borders of the cover and of the substrate—from preferably the following conductive assembling means: a metal weld, a solder.

The active device requires means of electrical connection to an external power source. These connecting means must be designed in order to avoid any short-circuit.

Conventionally, the active system is arranged between two electrodes. The lower electrode is the closest to the substrate (or is even a part of a conductive substrate), and the upper electrode is the furthest from the substrate.

The metal surround according to the invention may advantageously serve at least for a first electrical connection to one of the electrodes.

For this purpose, the device may comprise at least one of the features described below (cumulative or alternative) for the connection or connections.

For at least the first electrical connection, and preferably for each of the electrical connections, it comprises at least one of the following means:
- an internal electrical connecting means, for at least the first electrical connection, selected in particular from at least one of the following electrical connecting means associated with the surround:
- at least one electroconductive wire, for example metallic, for example made from copper, gold, silver, aluminum, tungsten,
- at least one electroconductive strip, optionally (self-)adhesive, in particular metallic of the foil type, for example between about 50 μm and 100 μm thick, optionally extending preferably along a main internal border of the substrate or of the cover for better power distribution,
- an electroconductive filling material, in particular a foam, a material that is optionally adhesive deposited by inkjet containing metal (nano)particles such as silver or copper,
- an electroconductive enamel, about 10 μm to 100 μm thick, optionally extending preferably along a main internal border of the substrate or of the cover for better power distribution,
- an electroconducting cement, for example an epoxy cement containing silver, at least one metal weld optionally prolonging one or more of the assembly welds.

A known foil is a thin strip of copper 50 to 100 μm thick and having a width of between 1 and 100 mm, preferably between 3 and 5 mm. The copper strips are coated with a tin plating, for example based on tin or a tin lead alloy to limit the corrosion and to facilitate the electrical contacts, for example by metal welds.

To simplify the connection by the metal surround, the device may comprise, at least for the first electrical connection, internal connection means projecting on at least one border of the edge of said substrate or of said cover, and is selected from one or the following means:
  a foil type electroconductive strip,
  an electroconductive enamel,
  an electroconductive cement,
  an electroconductive thin layer (mono- or multilayer), optionally transparent,
  these means preferably being associated with metal assembly welds by the edge of the cover or of the substrate,
  and/or a projecting portion of one of the electrodes, in particular under a metal assembly weld of the edge of the cover or of the substrate.

The other electrode added on to the substrate may, conversely, be non-projecting unconfined to the main internal face of the substrate.

According to one feature, one of the electrodes may comprise two projecting portions on two borders, optionally opposite borders, of the edge of the substrate or of the cover, one of the projecting portions being electrically insulated from the other projecting portion (by any mechanical chemical means or laser treatment) and serving as an electrical connection of the other electrode.

The metal surround may be at least in two parts serving as a distinct electrical connection, the parts being joined and electrically insulated by at least one of the following joining means):
  material based on thermofusible polymer(s) selected from at least one of the following polymer families: ethylene vinylacetate, polyisobutylene, polyamide, optionally covered with a material that is leakproof to liquid water such as polysulfide or polyurethane or silicone,
  an adhesive leakproof to water vapor and liquid water of the cement type like a thermofusible cement such as polyurethane.

Means identical to the non-conductive assembling means are preferably selected.

The surround may be a single metal part, and preferably, the second electrical connection is provided by a through hole preferably arranged in the dielectric selected cover, the hole being filled with a metal solder and/or with another conductive material (form, etc.). The hole may have a size of about 5 mm.

Moreover, a covering metal pellet may be soldered around the hole.

The second electrical connection (and/or the first electrical connection) may alternatively be provided by an electrical connecting element projecting outside the device between the metal based surround and to the substrate or the copper, said element preferably being one or the following means:
  an electroconductive layer (mono or multilayer), preferably thin, for example a conductive enamel or any material mentioned for electrodes optionally electrically insulated if the assembling means are (relatively) conductive and/or the surround is made from a single metal part,
  or an electroconductive strip of the foil type, optionally electrically insulated if the assembling means are (relatively) conductive and/or the surround is made of a single metal part.

As previously indicated, the cover may be spaced or sealed to the substrate by means called peripheral means surrounding the layer or by means, called covering means, on the active system, or the substrate and the cover may be maintained at a distance by said surround. The space may be filled with gas, inert or active (for example hydrogen) with regard to the inorganic electrochemical system.

The device may thus form a laminated glazing. Laminated glazings commonly consist of two rigid substrates between a sheet or a suspension of sheets of polymer of the thermoplastic type are placed. The invention also includes laminated glazing called "asymmetrical" glazing using a single rigid protective substrate of the glass type associated with a plurality of protective polymer sheets.

The invention also includes laminated glazing having at least one lamination spacer based on a single or two-sided adhesive polymer of the elastomer type (that is not requiring a lamination operation in the conventional sense of the term, lamination imposing heating generally under pressure to soften the thermoplastic spacer and to make it adhesive).

In this configuration, the ceiling means may then be a lamination spacer, in particular a sheet of thermoplastic material of polyurethane (PU), polyvinylbutyral (PVB), or ethylene vinylacetate (EVA).

The lamination spacer may serve to avoid a bending of the cover in particular for large devices, for example having an area higher than $0.5 \text{ m}^2$.

The substrate and the cover may be assembled by a lamination insert, preferably having substantially the same size.

The spacer optionally comprises a network of electroconductive wires encrusted on its surface, called internal, facing an electrode, and/or an electroconductive layer or electroconductive strips on said internal surface.

And in this latter conception, preferably, it may comprise one of the following electrical connection means associated with one or the other of the electrodes:
  an electroconductive strip U-shaped, preferably of the foil type, fixed at least one border of the lamination spacer (preferably by softening of the thermoplastic material) and in contact with an internal wall of the metal surround (preferably by welding),
  an electroconductive strip U-shaped, preferably of the foil type, with a first end associated with said electrode (preferably welding) and with a second end in contact with a through hole filled with metallic material of a dielectric cover and between these ends, a portion passing through said spacer which is cut.

The active system having variable energy/light transmission properties may be of various conceptions:
  either the system is supported (only) by the substrate,
  or one of the electrodes, called the lower electrode, is associated with the substrate, deposited in particular on the substrate, the other of the electrodes (monolayer or multilayer), called upper electrode, is at least partly associated with the cover, in particular deposited on the cover.

The abovementioned connecting methods are suitable regardless of the electrode configurations.

In a first configuration, the lower electrode is an electroconductive layer, wider than the active layer and extending for example on one border of the substrate. The upper electrode is an electroconductive layer prolonged on the substrate, and extending for example on the opposite border. The connections occur on the inner face of the substrate and/or on its edge (projecting electrode, etc.).

In a second configuration, the upper electrode is not added on to the substrate, it is electrically connected:

by the side, above the substrate (for example by an internal wire and/or by a cement, a foil, etc.), and/or by the top for example by the perforated cover or by an electroconductive assembling means and/or by a network of electroconductive wires encrusted on the surface of a lamination spacer forming said covering means.

The device is not necessarily symmetrical. Thus, different electrical connecting methods may be provided for the two electrodes, or even methods of asymmetrical assembly.

The electrodes may be electroconductive layers advantageously selected from metal oxides in particular the following materials:

doped tin oxide, in particular with fluorine $SnO_2$:F or with antimony $SnO_2$:Sb (the precursors usable in case of deposition by CVD may be organometallics or tin halides associated with a fluorine precursor of the hydrofluoric acid or trifluoracetic acid type), doped zinc oxide, in particular with aluminum ZnO:Al (the usable precursors, in case of deposition by CVD, may be organometallics or zinc and aluminum halides) or with gallium ZnO:Ga, or even doped indium oxide, in particular with tin ITO (the usable precursors in case of deposition by CVD may be organometallics or tin and indium halides), or indium oxide doped with zinc (IZO).

Use can generally be made of any type of transparent electroconductive layer, for example layers called TCO (Transparent Conductive Oxide) for example having a thickness between 20 and 1000 nm.

Use can also be made of metal thin layers called TCC (Transparent Conductive Coating) for example of Ag, Al, Pd, Cu, Pd, Pt In, Mo, Au and typically having a thickness between 2 and 50 nm. The electrodes are not necessarily continuous.

The electrodes may be deposited on a flexible substrate such as PET (polyethylene terephtalate) which is placed between two sheets of thermoplastic polymer of the PVB (polyvinylbutyral) type for assembling the two rigid protective elements of the glass type.

The substrate or the cover may be of any type (mineral, in particular glass, or organic, particularly plastic) insofar as they are sufficiently tight to dust, liquids and gases.

They may preferably be rigid or semi-rigid. In the context of the present invention, "rigid or semi-rigid" means an element which may be based in particular on glass or polymer(s) of the polyethylene terephtalate PET, polymethylmethacrylate PMMA or polycarbonate PC type.

The substrate and/or the protective cover may in particular be sheets of glass for example soda lime glass, flat, convex, and/or tempered optionally associated with polymer sheets (PET, etc.). The protective cover may have a size smaller, larger than or equal to that of the substrate.

The cover and/or the substrate may be transparent, semi-opaque, opaque according to the emission configurations.

The cover and the surround may have roughnessess or complementary texturizings in an assembly zone in order to hinder the penetration of water. This preferably involves the main borders of the cover or of the substrate.

In particular in the case of an assembly by the edge, the substrate may have a smooth edge for a better assembly.

The device may also integrate any known functionalization (s) in the field of glazing. Among the functionalizations, mention can be made of hydrophobic/oleophobic layer, hydrophilic/oleophilic layer, photocatalytic dust repellant layer, stack reflecting heat radiation (solar control) or infrared radiation (low-emissive), antiglare, reflecting layer for mirror effect.

The active device according to the invention (alternative or cumulative choice) may be intended for a building mounted optionally as double glazing, forming a facade, a (French) window.

The active device according to the invention may be intended for a transport vehicle, such as a rear window, a side window or an automobile roof, a rear-view mirror, a windshield or a portion of windshield, or for any other land, aquatic or aerial vehicle, in particular a window or a cockpit.

The active device according to the invention may be intended for urban furniture such as a bus shelter wall, maybe a display case, a jewelry display, a shop window, a greenhouse.

The active device according to the invention may be intended for interior decoration, in particular as a shelf element, a mirror, a furniture fagade, an aquarium wall, a paving block, for wall, floor or ceiling linings.

The active device according to invention is optionally placed in front of a light fixture to adjust the intensity or facing an element that is temporarily masked, intermittently, particularly in the extinguished position.

The active device according to the invention may be an optical element such as a camera lens, or be used as the front or the element to be placed on or close to the front on a display screen of an apparatus such as a computer or a television or a lighting fixture.

DETAILED DESCRIPTION

Figure 1A:
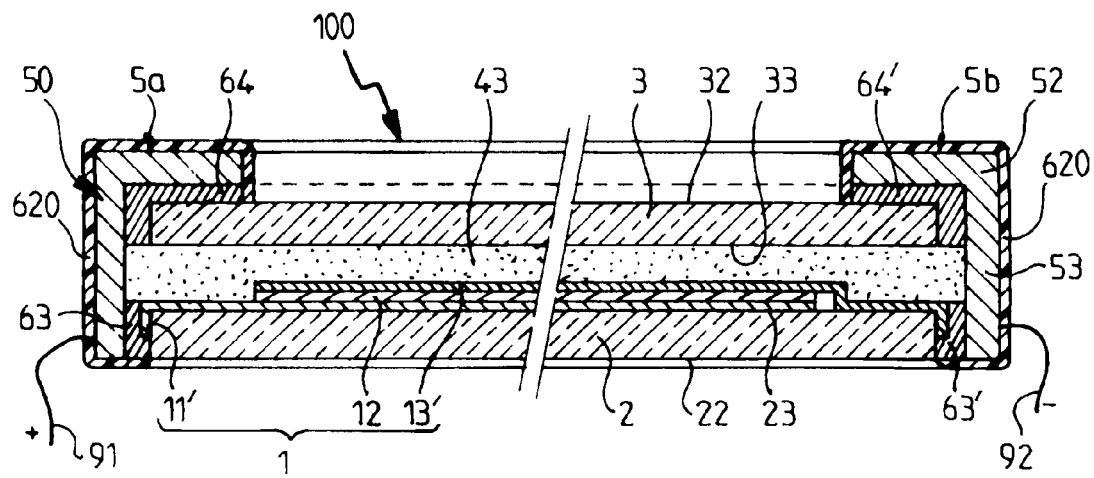
FIGS. 1a to 1d are partial schematic views in a side section and from below of an active device in a first embodiment.

The present invention will be better understood from a reading of the detailed description below of exemplary embodiments that are nonlimiting, and the following FIGS. 1 to 10, which schematically show partial views of active devices having variable energy/light transmission properties in various embodiments of the invention.

For the sake of clarity, the elements in the figures are not drawn to scale.

FIGS. 1a to 1d show partial schematic views in a side section and from below of an active device 100 in a first embodiment of the invention.

The device 100 is an inorganic electrochromic device comprising for example:
- a lower electrode 11 comprising a stack of layers of the type ITO/ZnO:Al/Ag/ZnO:Al/ITO having respective thicknesses of 15 to 20 nm for ITO/60 to 80 nm for ZnO:Al/3 to 15 nm for silver/60 to 80 nm for ZnO:Al/15 to 20 nm for ITO, or is based on ITO (indium tin oxide) having a thickness of 500 nm, hot deposited (350° C.),
- an active stack 12 formed from
  - a first layer of anode electrochromic material of indium oxide (hydrate) of 40 to 100 nm or of nickel oxide hydrate of 40 to 400 nm, alloyed or not with other metals, such as cobalt, rhenium, rhodium,
  - a first electrolyte layer preferably made from tungsten oxide having a thickness of 100 nm or of silicone nitride optionally alloyed with aluminum or boron, boron nitride, aluminum nitride,
  - a second electrolyte layer of tantalum oxide hydrate or silicon dioxide hydrate or zirconium oxide hydrate with a thickness of 100 nm, the latter two layers forming a layer having an electrolyte function,
  - a second layer of cathode electrochromic material based tungsten oxide $WO_3$ with a thickness of 370 nm,
- an upper electrode 13 for example based on ITO or $SnO_2$:F with a thickness of 100 to 300 nm.

The glass sheet 2 is about 2 to 10 mm thick, optionally extrabright (highlight $T_L$), with a surface of possibly about 1 $m^2$, and with main outer 22 and inner 23 borders. Its edge 21 is preferably smooth.

The device 100 further comprises a protective cover 3 of the active system 12, a cover leakproof to dust, air, liquid water, water vapor. This cover 3 is preferably a glass sheet which comprises main outer 32 and inner 33 borders and an edge 31, the cover may be thin or thick, for example having a thickness of between 0.5 mm and 10 mm, in particular about 1 mm.

The sheets 2 and 3 are optionally heat tempered or chemically hardened and convex.

The protective cover 3 has for example the same shape as the substrate 2 for example rectangular.

The device 710 is laminated using a lamination spacer 43, in the form of a thermoplastic sheet particularly of the type PU, PVB or EVA for example having a thickness of about 0.4 mm to 0.8 mm.

The device 100 is further provided with a metal surround 50 on the periphery of the device 100, and assembled in order to procure reinforced leaktightness to air, dust, liquid water, water vapor and also better mechanical strength.

This surround 50 is made of two parts 5a, 5b for example each forming an L, in a side section. Each part 5a, 5b comprises:
- a side portion 51, 53 pressed against one border or borders of the edge 21 of the substrate 2,
- a covering portion 52, 54, planar, at 90° from the side portion 51, 53 and assembled to the substrate 3 by one or the main outer borders 32 of the cover 3.

For the sake of clarity, the two parts 5a and 5b are not shown in full in FIG. 1a.

Figure 1B:
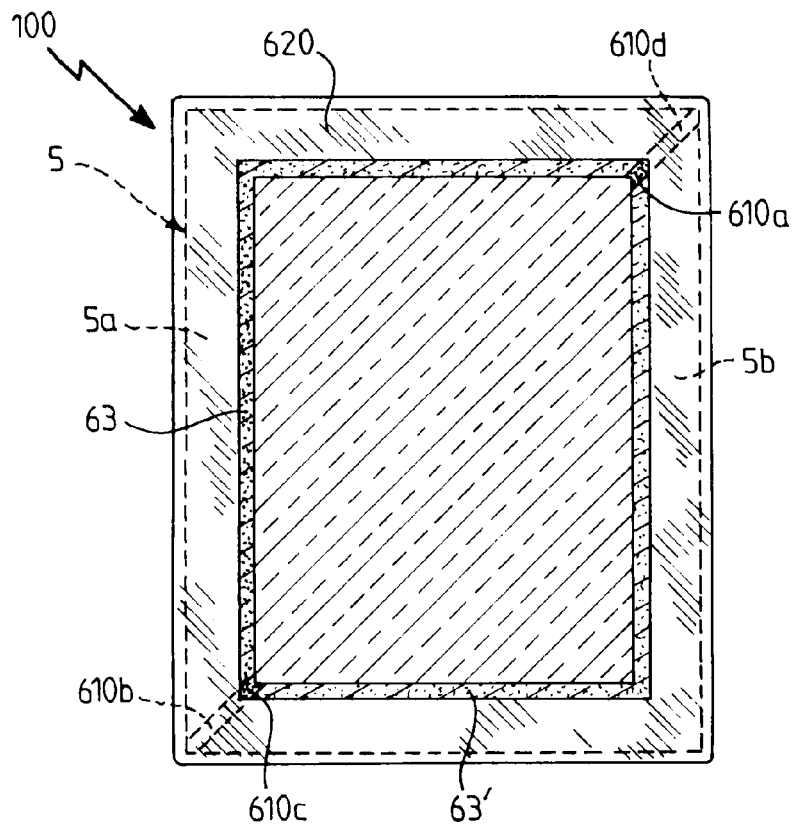

As shown in FIG. 1b, these side portions 51, 53 may form two "L" in a planar cross section or, as an alternative not shown, two "U".

The side portions 51, 53 may be pressed against the periphery by bending. The covering portions 52, 54, may be folded back on the cover 3 also by bending.

Figure 1C:
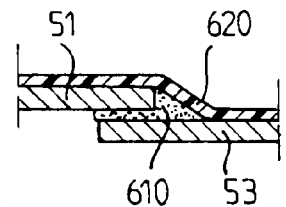

In order to surround the entire periphery, the free ends of the two parts of the surround may overlap in pairs (as shown in FIG. 1c). This configuration is preferred when the parts are made from metal sheets, for example of aluminum about 500 µm thick.

Figure 1D:
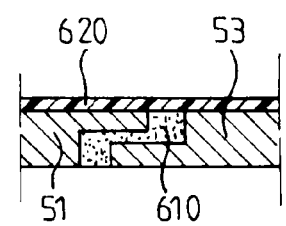

In order to surround the entire periphery, the free ends of the two parts of the surround may alternatively have complementary shapes adapted to cooperate mutually in order to produce their assembly with an abutment, and may also overlap in pairs (alternative shown in FIG. 1d). This configuration is preferred when the parts are thicker having a thickness of about 1 mm, for example to facilitate their fastening and/or to stiffen the device 100.

The surround may be protected from corrosion, for example by a plastic such as polysulfide 620 or polyimide.

To deliver penetration of water, the inner surfaces of the covering portions 52, 54 and the main outer borders 32 of the cover 3 may have complementary texturizings in the assembly zones.

The inner walls of the side and covering portions 51 to 54 are assembled to the edge 31 of the cover and to the outer borders 33 of the cover mainly by welds 63, 64, 63', 64'. An ultrasonic tin-plating procedure is preferably provided on the cover and/or on the substrate to ensure wetability between the glass and the weld material. The welds 63 and 64 or 63' and 64' may naturally be joined.

The metal welds 63, 63' provide the electrical connections between the two metal parts 50 and the two electrodes 11', 13'. The electrodes are projecting 11', 13' each on a different (here opposite) border of the edge 21 of the substrate. These projections, for example obtained directly by the electrode deposition method, facilitate the electrical linkages with the metal welds 63, 63'. Each part 5a, 5b therefore serves for the external electrical connections by any known connection means (wires 91, 92, foil, plugs, etc.).

To avoid short-circuits, use is made for assembling the parts 5a, 5b and for joining the metal parts 5a, 5b of the surround 50, of electrical insulating means 610a to 610d, preferably leakproof to water vapor and/or liquid water as shown in FIG. 1b.

A material may be selected based on thermofusible polymer(s) selected from at least one of the following polymer families: ethylene, vinylacetate, polyisobutylene, polyamide, for example a gray polyisobutylene sold by Teroson under the trade name "Terostat—969G", having an electrical conductivity lower than $10^{-4}$ ohm$^{-1}$.cm$^{-1}$, a material optionally covered by a material leakproof to liquid water, such as a polysulfide or a polyurethane.

An adhesive leakproof to water vapor and liquid water, of the cement type, such as a thermofusible polyurethane, may also be selected.

As an alternative, the welds 63, 63' may only be present in a plurality of restricted zones as supplementary seals. In this configuration, it is then preferable to add silver enamel type busbars or foils on the electrodes 11', 13' for better power distribution.

Figure 2:
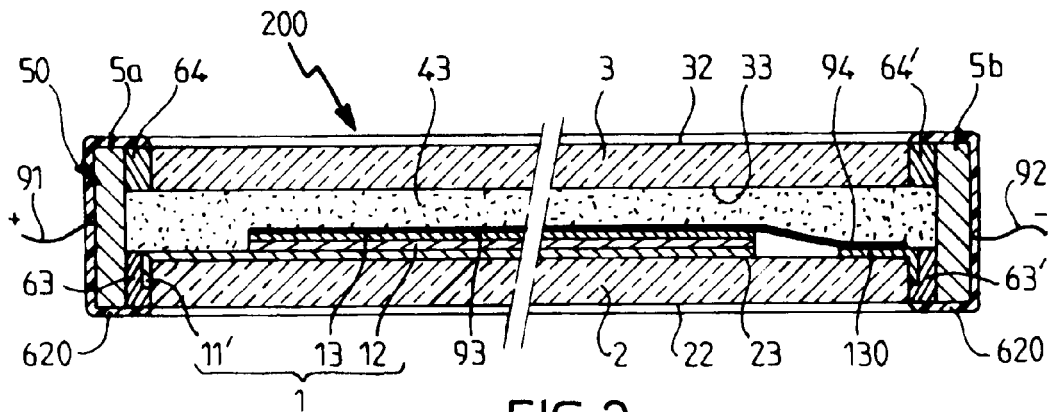
FIG. 2 is a schematic cross section of an active device in a second embodiment.

FIG. 2 shows a schematic cross section of an active device 200 in a second embodiment of the invention.

This second device 200 differs from the device 100 by the features described below.

The upper electrode 13 does not extend on the substrate. It is associated with other conductive elements, for example a layer more conductive than itself, and/or with a plurality of conductive strips or wires. For further detail, reference can be made to patent WO-00/57243 for the implementation of such "multicomponent electrodes".

Thus to the upper electrode 13 (optionally surmounted by one or more other conductive layers) a network of conductive wires 93 may be applied (parallel, in a grid, etc.) encrusted on the surface of the lamination spacer 43.

The end 94 of the network of wires 93 serves to connect the upper electrode 13 to the metal weld 63' via a conductive zone which is preferably a "busbar" type strip 130 of conductive silver enamel, for example deposited by screen printing, and about 10 to 100 μm thick, or even of a material deposited by inkjet loaded with metal (nano)particles of the silver or copper type or even a foil with one end preassembled on the spacer or even a conductive cement of the epoxy type with silver. This zone 130 in a square projects on one of the borders of the edge 21.

As another alternative, the electrode 11' projects on two borders (opposite here) of the edge 21. One of the projecting portions is insulated, and then comes into contact with the network of wires 94 thereby optionally replacing the busbar 130.

Measures are naturally taken so that neither the network 93 nor the conductive zone 130 touches the lower electrode 11'.

As an alternative, the network of wires 93 is replaced by at least one electroconductive layer and/or by one or more added on conductive strips.

Each part 5a, 5b of the surround 50 has a cross section (devoid of covering portions) and a sufficiently thick cover is selected to maintain the surround.

Naturally, the welds 63 and 64 or 63' and 64' may be joined.

Figure 3:
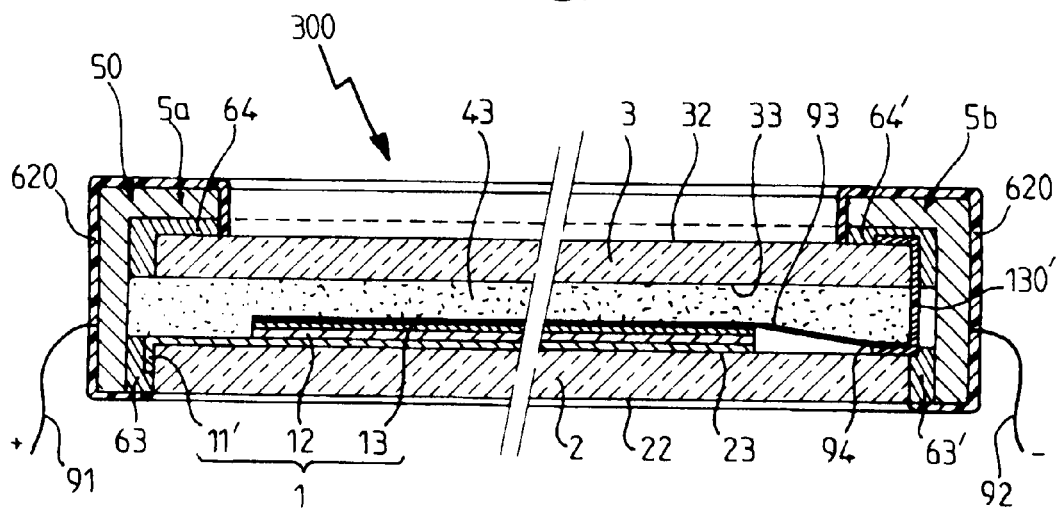
FIG. 3 is a schematic cross section of an active device in a third embodiment.

FIG. 3 shows a schematic cross section of an active device 300 in a third embodiment of the invention.

This third device 300 differs from the preceding devices by the features described below mainly concerned with the internal connection means.

The end 94 of the network of wires 93 serves to connect the upper electrode 13 to one of the metal welds 64' of the cover 3 via a U-shaped foil type strip 130' of tin-plated copper. This foil 130' has:

a portion that is both (pre)fixed—for example by softening the spacer—against the spacer 43 and pressed or fastened—for example by weld or conductive cement particularly epoxy containing silver or by material deposited by inkjet loaded with metal (nano)particles such as silver or copper—to the inner border 23 of the substrate, a portion that is both (pre)fixed against the edge of the spacer 43, for example by softening the spacer, by pressed or fastened—for example by weld or conductive cement in particular epoxy containing silver or even by material deposited by inkjet loaded with metal (nano) particles such as silver or copper—to the edge of cover 31, and a portion pressed or fastened—for example by weld or even by material deposited by inkjet loaded with metal (nano)particles such as silver or copper—against the outer border 32 of the cover 3.

Measures are naturally taken so that neither the network 93 nor the foil 130' touches the lower electrode 11'.

Figure 4:
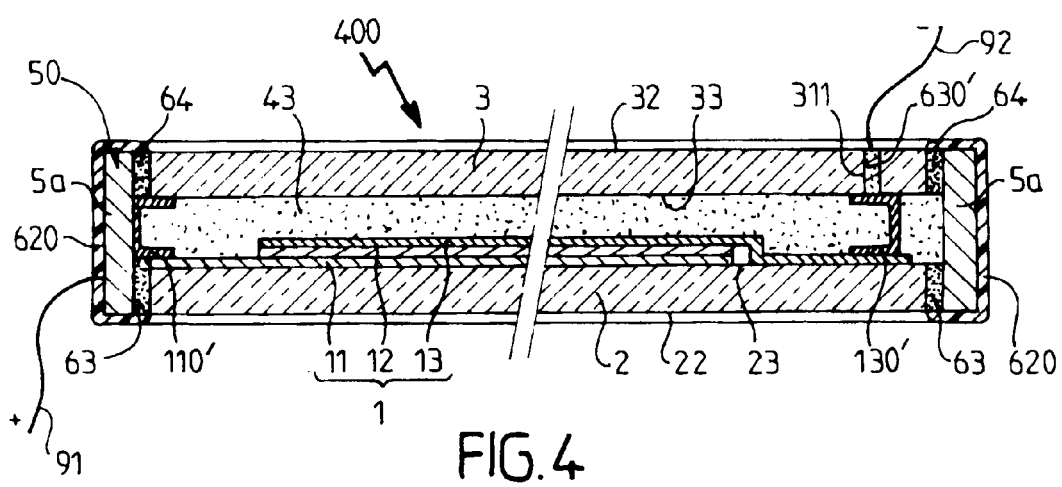
FIG. 4 is a schematic cross section of an active device in a fourth embodiment.

FIG. 4 shows a schematic cross section of an active device 400 in a fourth embodiment of the invention.

This device 400 differs from the preceding device 300 by the features described below concerned particularly with the internal connection means.

For the electric power supply of the lower electrode 11, it comprises a first U-shaped foil type strip 110', which is both (pre)fixed—for example by softening the spacers—against the spacer 43 and pressed or fastened—for example by weld, conductive cement—to the inner wall of the part 5a, the non-projecting electrode 11, the main inner border of the cover 3.

For the electric power supply of the upper electrode 13, it comprises a second U-shaped foil type strip 130', which passes through the spacer 43 cut for this purpose, and is (pre)fixed—for example by softening the spacer—against the spacer 43. This foil 130' is pressed or fixed on one side—for example by weld, conductive cement in particular epoxy containing silver, or of a material deposited by inkjet loaded with metal (nano)particles such as silver or copper—to the inner wall of the part 5a, on the non-projecting electrode 13, and covers a through hole 311 filled with metallic material, preferably metal weld 630'. The hole is 1 to 10m wide, preferably 3 to 7 mm wide.

Since the surround 50 only serves for the first electrical connection, it may be made from a single metal part 5a assembled by one or more welds 63, 64 over the whole periphery.

Figure 5:
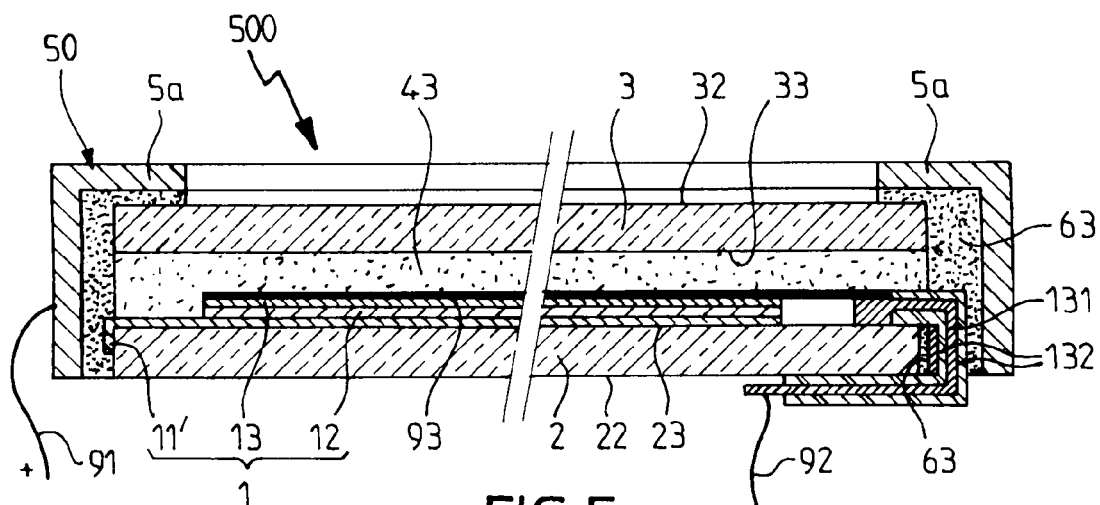
FIG. 5 is a schematic cross section of an active device in a fifth embodiment.

FIG. 5 shows a schematic cross section of an active device 500 in the fifth embodiment of the invention.

This device 500 differs from the device 200 by the features described below.

The surround 50 serves only for the first electrical connection, and may be made from a single metal part 5a, for example L-shaped (hence with covering portions) assembled by welds 63 to the whole periphery.

For the electric power supply of the upper electrode 13, a foil type strip 131 is used, projecting outside the device and insulated for example by polyimide 132 which is preferably metallized on the outer surface for the welds 63.

Figure 6:
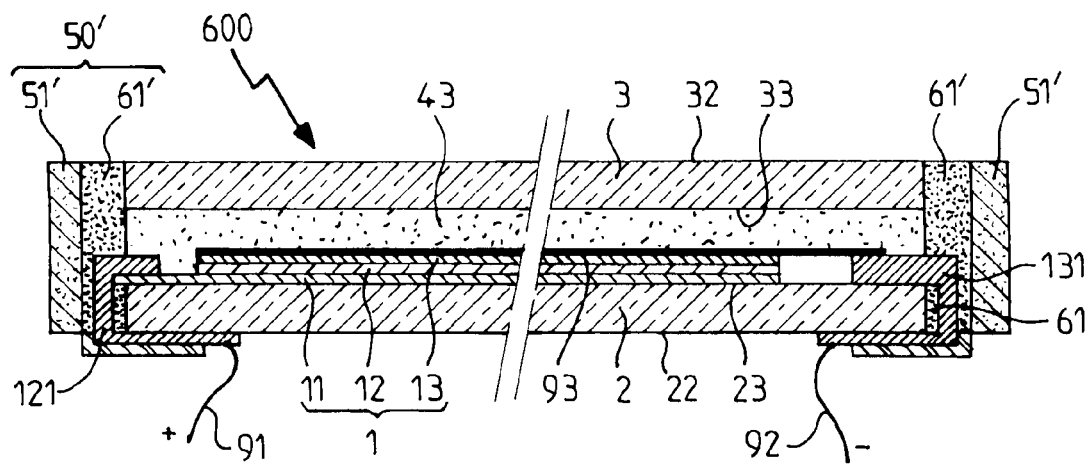
FIG. 6 is a schematic cross section of an active device in a sixth embodiment.

FIG. 6 shows a schematic cross section of an active device 600 in a sixth embodiment of the invention.

This device 600 differs from the preceding device 500 by the features described below concerning the external electrical connection means and the assembling means.

The surround 50 still made of a single piece 5a does not serve for the electrical connections. The surround and the associated assembling means form a single element 50' of the adhesive tape type comprising an adhesive membrane 61' composed in bulk of butyl (plastoelastic butyl, butyl rubber) covered on the outer surface with a tear-proof film resistant to UV and weather, composed of metal and synthetic material(s) 51'.

For the connections of the electrodes 11', 13, use is made of two foil type strips 110', 130' on the butyl. These strips are covered or not with a polyimide insulation according to the electrical conduction properties of the butyl.

Figure 7:
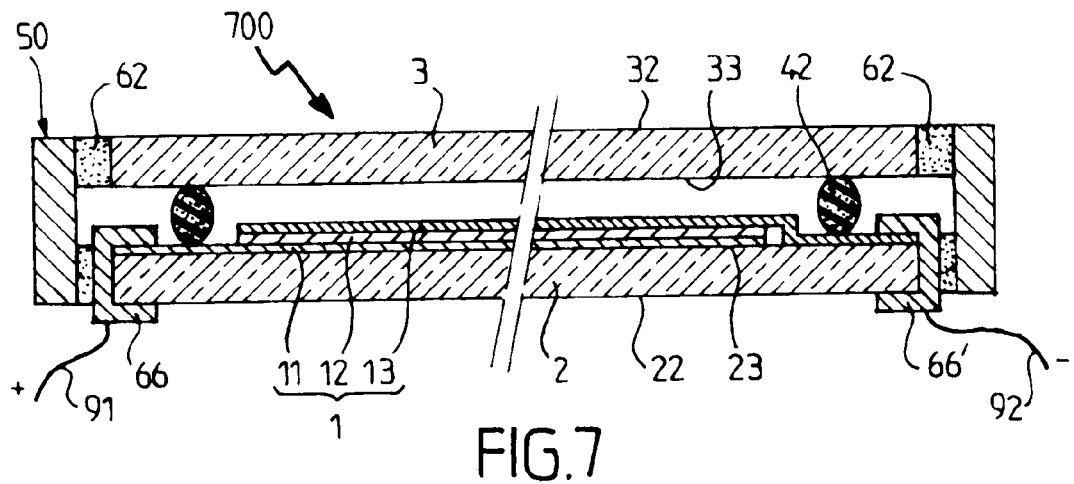
FIG. 7 is a schematic cross section of an active device in a seventh embodiment.

FIG. 7 shows a schematic cross section of an active device 700 in a seventh embodiment of the invention.

This device differs from the preceding devices by the features described below concerning the assembly of the cover and the substrate and the type of external electrical connection means.

The cover 3 and the substrate 2 are assembled by a molten glass frit 42 having a thickness of about 100 μm.

The electrical connections are prepared before the assembly of the two parts 5a, 5b of the surround 50 as soon as possible after the formation of the electrodes 11, 13 and at the latest before the sealing with the glass frit 42.

For this purpose, by way of example, two opposite borders of the edge of the substrate 2 are immersed in succession in a bath of tin or silver to form the projecting layers for the connections 66, 66'.

The parts 5a, 5b are assembled and joined by insulating means leakproof to water vapor and liquid water, as already described for the device 600.

As an alternative, foils are soldered at the border, preferably before the assembly to the substrate, which are square shaped.

Figure 8A:
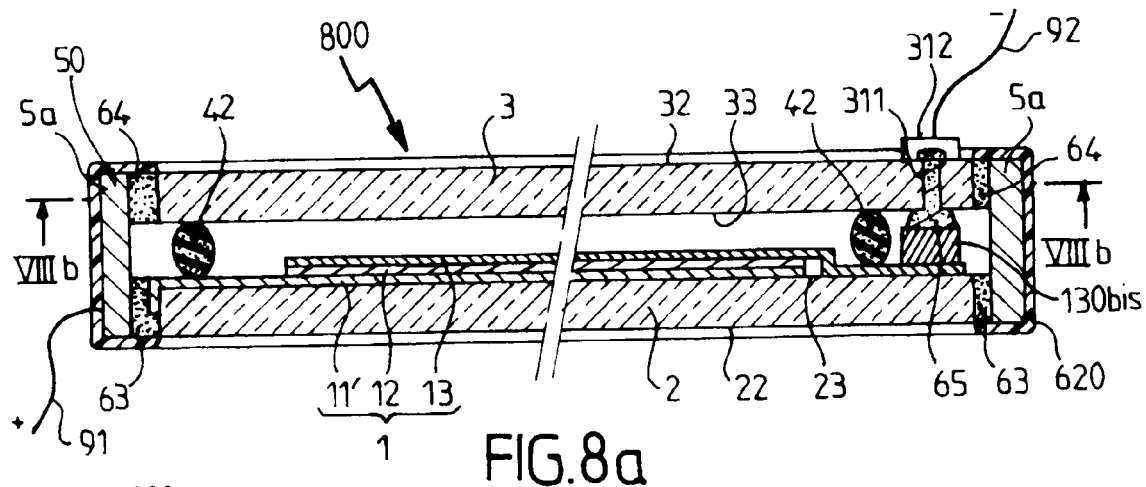
FIGS. 8a to 8b are schematic cross sections and plan views of an active device in an eighth embodiment.
Figure 8B:
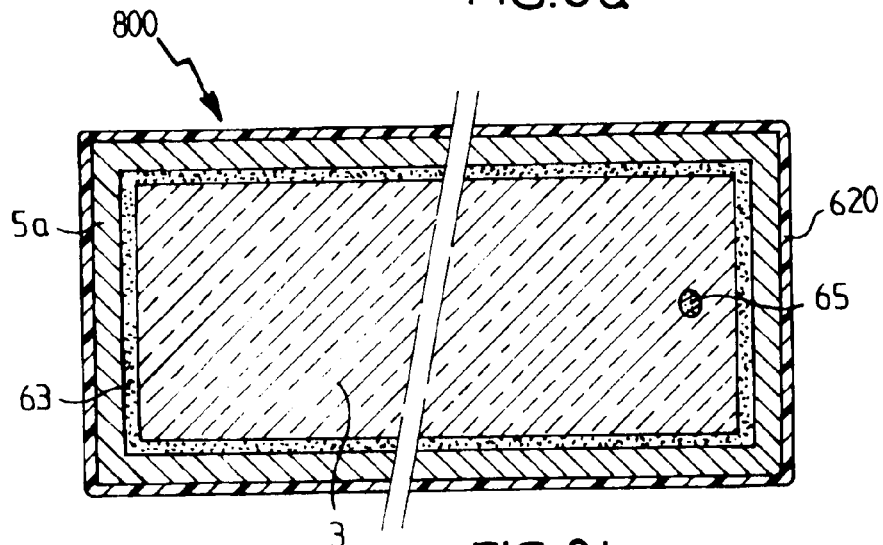

FIGS. 8a and 8b show schematic cross sections and plan views of an active device 800 in an eighth embodiment of the invention.

This device 800 differs from the preceding devices 700 by the features described below.

For the electric power supply of the upper electrode 13, the cover 3 comprises a through hole 311 facing this electrode 13. Conductive material 65—for example an epoxy resin containing silver—is injected and forms a conductive column in the respective spaces between the cover and the electrodes 11, 13, in contact with a conductive zone, for example a silver enamel busbar strip 130. Preferably, a pellet 312 is soldered by its borders to seal the hole 311.

Since the surround 50 serves only for the first electrical connection, it may be made from a single metal part 5a assembled by one or more welds 63, 64 on the whole periphery (see FIG. 8b).

Figure 9:
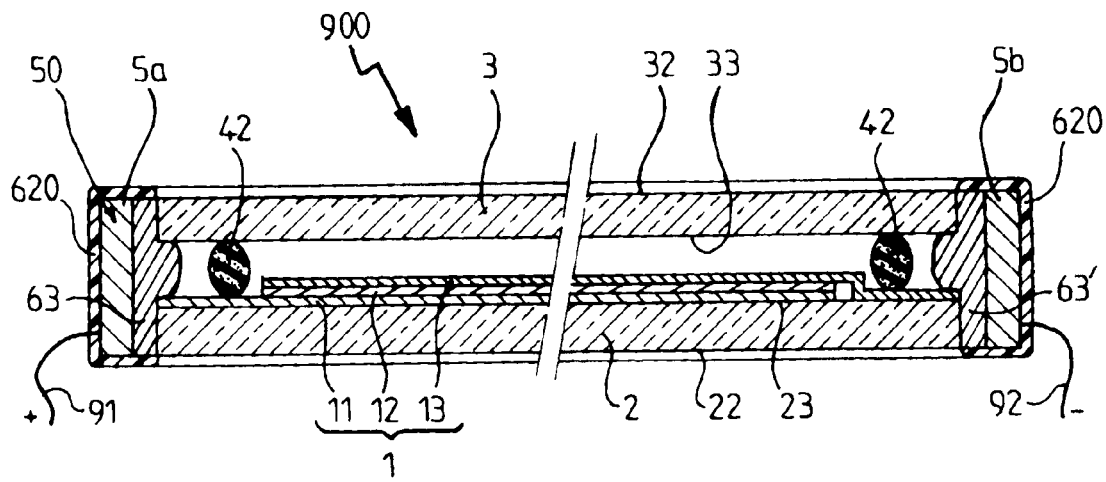
FIG. 9 is a schematic cross section of an active device in a ninth embodiment.

FIG. 9 shows a schematic cross section of an active device 900 in a ninth embodiment of the invention.

This device 900 differs from the device 700 by the features described below.

The surround 50 is made of two straight metal parts 5a, 5b electrically insulated by the abovementioned leakproof means and assembled by welds 63, 63' insulated electrically from one another also by the above-mentioned leakproof means.

To promote the electrical connections between the welds and the electrodes not projecting on the edge, tack welds can already be preformed before assembly at the periphery of the inner borders 23 of the substrate.

As an alternative not shown, a cover is selected with a bevel or having a size lower than that of the substrate.

In all the configurations presented, the connections are made on the opposite borders of the substrate. The arrangement of the electrodes on the substrate may be different. For example, the upper electrode may be present at the four corners of the inner borders of the substrate and the lower electrode may extend along these inner borders 23 between these corners. Thus the positions of the connections are selected accordingly.

If the assembling means are essentially or entirely of the metal weld or metal solder type and if the surround is essentially or entirely made from metal (in one or two joined parts, with a circular or U cross section, etc.), the invention further extends:

to essentially organic electrochromic systems described for example in patents EP-253 713, EP-670 346, the electrolyte being in the form of a polymer or a gel and the other layers being of the mineral type, to electrochromic systems in which all the layers are of the polymer type, referred to as "all-polymer" electrochrome, to hybrid polymer-mineral electrochromic systems, to viologenic glazings, which serve to adjust the light transmission or absorption, like those described in patents U.S. Pat. No. 5,239,406 and EP-612 82.

As organic materials, mention can be made of viologens (bipyridinium salts) 5,10-dihydrophenazines, 1,4-phenylenediamines, benzidines, metallocenes, Prussian blue or electron-conducting polymers (polythiophene, polypyrrole, polyaniline, etc.) or metallopolymers containing inorganic electrochromic materials, or even by using only organic electrochromic materials.

When use is made of a stack structure essentially based on organic materials, the structure may have three layers, electrode 1/active layer AC/electrode layer 2, in which the active "layer" AC is in the form of a polymer matrix, a gel or a liquid. The AC layer then comprises, in the same medium, all the necessary electroactive materials, that is in particular the species having anode or cathode coloration and optionally ionic salts having an electrolyte function, solubilized in a propylene carbonate type solvent. Furthermore, the AC layer may also contain one or more polymers and additives. The interpenetrated network polymer systems described in application FR2857759 are also constructed on this three-layer model. Moreover, the simple systems conventionally called "viologens", in which the cathode coloration species such as bipyridinium salts (viologenic materials strictly speaking) and anode coloration species (for example phenazines) are solubilized in a liquid or a gel base for example on propylene carbonate, are also 3-layer systems.

A 3-layer system with the electrochemically active central AC layer may comprise, in the same medium, the electroactive materials with anode and cathode coloration, one or more solvents, optionally one or more polymers and optionally one or more ionic salts playing the role of electrolyte if necessary, the anode coloration species are organic compounds such as derivatives of phenazine, such as for example 5,10-dihydrophenazine, 1,4-phenylenediamine, benzidine, metallocene, phenothiazine, carbazole, the cathode coloration species are organic compounds such as derivatives of viologen (bipyridinium salt), such as methyl-viologen tetrafluoroborates or octyl-viologen tetrafluoroborates, or quinone or even polythiophenes, the solvents may be dimethylsulfoxide, N,N-dimethylformamide, propylene carbonate, ethylene carbonate, N-methylpyrrolidinone, gamma butyrolactone, ionic liquids, ethylene glycols, alcohols, ketones, nitriles, the polymers may be polyethers, polyesters, polyamides, polyimides, polycarbonates, polymethacrylates, polyacrylates, polyacetates, polysilanes, polysiloxanes, celluloses, the ionic salts are for example lithium perchlorate, salts of trifluoromethanesulfonate (triflate), salts of trifluoromethanesulfonylimide, ammonium salts or even ionic liquids, the AC layer has a thickness of 50 µm to 500 µm and preferably from 150 µm to 300 µm, the active species is present in the form of an electrochemically active layer which comprises at least one of the following compounds: oxide of tungsten W, niobium Nb, tin Sn, bismuth Bi, vanadium V, nickel Ni, iridium Ir, antimony Sb, tantalum Ta, alone or a mixture, and optionally comprising an additional metal such as titanium, tantalum or rhenium, the system further comprises a layer having an electrolyte function which is selected from silicone nitride ($Si_3N_4$), molybdenum oxide ($MoO_3$), tantalum oxide ($Ta_2O_5$), antimony oxide ($Sb_2O_5$), nickel oxide ($NiO_x$), tin oxide ($SnO_2$), zirconium oxide ($ZrO_2$), aluminum oxide ($Al_2O_3$), silicon dioxide ($SiO_2$), niobium oxide ($Nb_2O_5$), chromium oxide ($Cr_2O_3$), cobalt oxide ($CO_3O_4$), titanium dioxide ($TiO_2$), zinc oxide (ZnO) optionally alloyed with aluminum, tin zinc oxide ($SnZnO_x$), vanadium oxide ($V_2O_5$), at least one of these oxides optionally being hydrogenated, or nitrided.

For all these systems, all the abovementioned electrical connection means can be provided (internal and/or external, projecting or not, with a through hole, etc.), one or more electrodes with a portion projecting on an edge.

Figure 10:
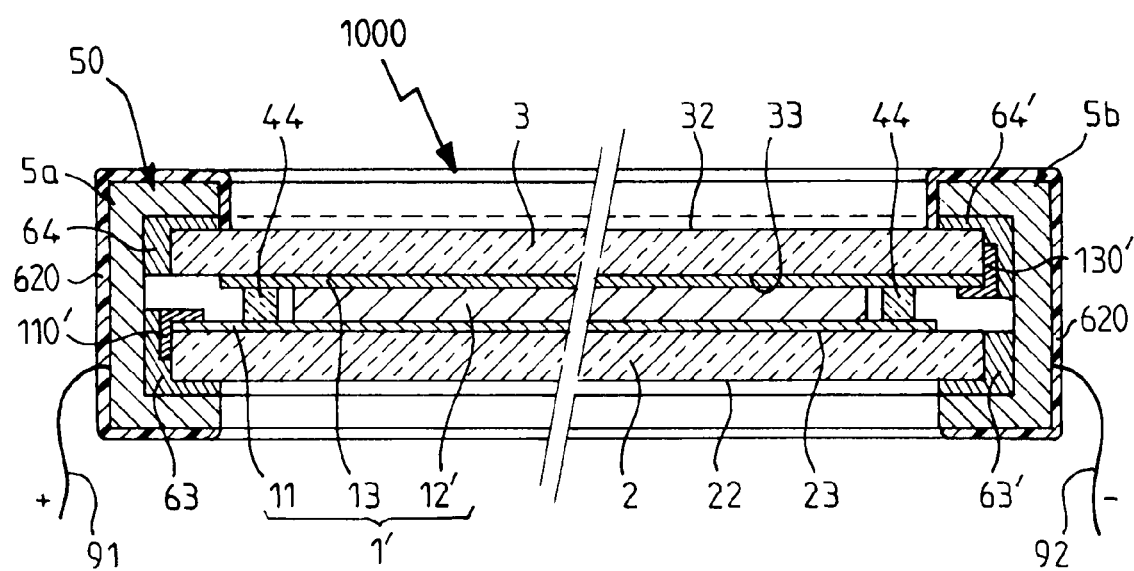
FIG. 10 is a schematic cross section of an active device with an essentially organic or hybrid electrochromic system in a tenth embodiment.

FIG. 10 shows a schematic cross section of an active device 1000 with an essentially organic or hybrid electrochromic system in a tenth embodiment of the invention.

This device differs from the preceding devices by the features described below.

The electrochromic system 12' comprises an organic or hybrid organic-inorganic active layer. The upper electrode 13 is deposited on the cover 3 and the peripheral means is a glass spacer 44.

The lower electrode 11 is connected to one or the metal welds 63 of the substrate via a U-shaped foil type strip 110'. This foil comprises:
- a pressed or even fixed portion—by conductive bonding or welding—to the inner border 33 of the cover,
- a pressed or even fixed portion—by conductive bonding or welding—on one of the borders of the edge 31 of the cover,
- optionally a pressed portion—by conductive bonding or welding—to the outer border 32 of the cover 3.

Similarly, the upper electrode 13' is connected to one of the metal welds 64' of the cover via a U-shaped foil type strip 130'.

Measures are taken so that each electrode 11', 13 does not touch the other of the metal welds 63', 64.

As an alternative, to preferably replace one or more foils, one or both electrodes are projecting on one border of the edge (of the substrate or of the cover) or use is made of one or more conductive enamel strips, for example screen printed and containing silver, or even a material deposited by inkjet loaded with metal (nano)particles such as silver or copper, or even conductive cement or even other conductive layers.

The devices described above have many applications.

The devices 100 to 1000 may be intended for building trades, thereby forming (part of) a façade, (part of) a window or a French window.

The devices 100 to 1000 may be intended for a transport vehicle, such as a rear window, a side window or an automobile roof, a mirror for a rear-view mirror or for any other land, aquatic or aerial vehicle, in particular a window or a cockpit.

The devices 100 to 1000 may be intended for urban furniture, such as a bus shelter, a display case, a jewelry display, a shop window, a shelf element, an aquarium wall, a greenhouse.

The devices 100 to 1000 may be intended for interior decoration, a furniture façade, a paving block, particularly of glass, for wall or floor linings, a ceiling slab for a kitchen buffet or for the bathroom.

The devices 100 to 1000 may be optical elements such as camera lenses, or even used as the front or an element to be placed on or near the front of display screens of apparatus such as computers or televisions or a lighting fixture.

The invention claimed is:

1. An active device having variable energy/light transmission properties comprising:
    an active system between a protective substrate and a protective cover, selected from an essentially inorganic electrochromic system, a light valve system, a liquid crystal system, a gasochromic system, and a thermochromic system; and
    a structure that is leakproof to at least one of liquid water and water vapor, which includes a surround having at least one metal based part on the periphery of the device, wherein the surround is attached at least partly to at least one of an edge of said substrate and an edge of said protective cover by a means for assembling that forms at least part of the leakproof structure,
    at least part of the means for assembling is conductive and includes at least one metal weld,
    the active system is arranged between two electrodes, and the surround is entirely metal and serves as at least a first electrical connection to one of the electrodes.

2. The active device having variable energy/light transmission properties as claimed in claim 1,
    wherein the surround and the means for assembling form at least a majority of the structure that is leakproof to at least one of liquid water and water vapor.

3. The active device having variable energy/light transmission properties as claimed in claim 1,
    wherein the surround is attached at least partly to main outer borders of said protective substrate and said protective cover.

4. The active device having variable energy/light transmission properties as claimed in claim 1,
    wherein the means for assembling is at least partly selected from one of the following:
    a material based on thermofusible polymer(s) selected from at least one of the following polymer families: ethylene vinylacetate, polyisobutylene, and polyamide, the material being covered with another material that is leakproof to liquid water,
    at least one metal weld or a solder, and
    a cement adhesive that is leakproof to water vapor and liquid water.

5. The active device having variable energy/light transmission properties as claimed in claim 1,
    wherein each of the at least one metal based part of the surround and an associated means for assembling comprises a membrane composed in bulk of a material based on polyisobutylene, and
    an outer surface of the membrane is covered with a film composed of metal and a synthetic material.

6. The active device having variable energy/light transmission properties as claimed in claim 1,
    wherein the first electrical connection includes at least one of the following:
    an electroconductive wire,
    a metallic electroconductive strip, of foil,
    an electroconductive filling material,
    an electroconductive enamel,
    an electroconductive cement, and
    at least one metal weld.

7. The active device having variable energy/light transmission properties as claimed in claim 1,
    wherein at least the first electrical connection comprises:
    an internal connector that projects onto at least one border of an edge of said protective substrate or of said protective cover, and selected from at least one of an electroconductive strip of foil, an electroconductive enamel, an electroconductive thin layer, an electroconductive cement, and a projecting part of one of the electrodes.

8. The active device having variable energy/light transmission properties as claimed in claim 1,
    wherein one of the electrodes comprises a projecting portion and another projecting portion, the projecting portions disposed on opposite borders of the edge of the protective substrate or of the protective cover, and
    the projecting portion is electrically insulated from the another projecting portion and serves as an electrical connection of the another electrode.

9. The active device having variable energy/light transmission properties as claimed in claim 1, wherein the surround has at least two metal based parts serving as a distinct electrical connection, the at least two metal based parts being joined and electrically insulated by at least one of:
- a material based on thermofusible polymer selected from at least one of the following polymer families: ethylene vinylacetate, polyisobutylene, and polyamide,
- the thermofusible polymer that is covered with a material that is leakproof to liquid water, and
- a cement adhesive that is leakproof to water vapor and liquid water.

10. The active device having variable energy/light transmission properties as claimed in claim 1,
wherein the surround has a single metal part, and a second electrical connection is provided by a through hole arranged in the protective cover, the hole being filled with at least one of a metal solder and another conductive material.

11. The active device having variable energy/light transmission properties as claimed in claim 1,
wherein an electrical connection is provided by an electrical connecting element projecting outside the active device between said surround and the protective substrate or the protective cover, and
said electrical connecting element includes an electroconductive layer or a foil electroconductive strip.

12. The active device having variable energy/light transmission properties as claimed in claim 11,
wherein the protective cover is spaced or sealed to the protective substrate by a peripheral structure surrounding the electroconductive layer or by a cover on the active system, or the protective substrate and the protective cover are kept at a distance by said surround.

13. The active device having variable energy/light transmission properties as claimed in claim 1,
wherein the protective substrate and the protective cover are connected by a lamination spacer that includes a sheet of thermoplastic material having substantially a same size as the protective cover and the protective substrate.

14. The active device having variable energy/light transmission properties as claimed in claim 13, characterized in that the active device comprises one of the following electrical connecting means associated with one or the other of the electrodes:
- an electroconductive strip of a U-shaped foil, fixed at least one border of the lamination spacer and in contact with an internal wall of the metal surround, and
- an electroconductive strip of a U-shaped foil, with a first end associated with said electrode and with a second end in contact with a through hole filled with metallic material of a dielectric cover and between the first and second ends, a portion of the electroconductive strip passing through said spacer which is cut.

15. The active device having variable energy/light transmission properties as claimed in claim 13,
wherein the lamination spacer has an internal surface facing an electrode, and the lamination spacer includes at least one of a network of electroconductive wires encrusted on the internal surface and an electroconductive layer or electroconductive strips on the internal surface.

16. The active device having variable energy/light transmission properties as claimed in claim 1,
wherein the active system is an essentially inorganic electrochemical system comprising an electrochromic system.

17. The active device having variable energy/light transmission properties as claimed in claim 1,
wherein at least one of the protective substrate and the protective cover is a sheet of plate glass, at least one of convex and tempered, that is associated with a polymer sheet, and
main outer borders of the protective cover and associated borders of the surround have matching textures.

18. The active device having variable energy/light transmission properties as claimed in claim 1, further comprising:
a polysulfide or a polyimide that protects the surround is against corrosion.

19. The active device having variable energy/light transmission properties as claimed in claim 1,
wherein the active device is included in a facade, a window, an automobile roof, a mirror, an optical element, a front of a display screen, a paving block, or wall or floor or ceiling linings.

20. The active device having variable energy/light transmission properties as claimed in claim 1,
wherein the active device is included in a lighting fixture or in a display screen.

21. The active device having variable energy/light transmission properties as claimed in claim 1,
wherein free ends of two metal based parts of the surround overlap to surround an entire periphery of the device.

22. The active device having variable energy/light transmission properties as claimed in claim 1,
wherein free ends of two metal based parts of the surround have complementary shapes adapted to cooperate to assemble with an abutment and overlap to surround an entire periphery of the device.

23. The active device having variable energy/light transmission properties as claimed in claim 1,
wherein the surround has at least two metal based parts on the periphery of the device.

24. An active device having variable electromagnetic energy transmission properties comprising:
an active system between a protective substrate and a protective cover, selected from an essentially inorganic electrochromic system, a light valve system, a liquid crystal system, a gasochromic system, and a thermochromic system; and
a structure that is leakproof to at least one of liquid water and water vapor, which includes a surround having at least one metal based part on the periphery of the device,
wherein the surround is attached at least partly to at least one of an edge of said substrate and an edge of said protective cover by an assembly that forms at least part of the leakproof structure,
at least part of the assembly is conductive and includes at least one metal weld,
the active system is arranged between two electrodes, and
the surround is entirely metal and serves as at least a first electrical connection to one of the electrodes.

* * * * *